United States Patent [19]

Sawan et al.

[11] Patent Number: 5,756,657
[45] Date of Patent: May 26, 1998

[54] METHOD OF CLEANING PLASTICS USING SUPER AND SUBCRITICAL MEDIA

[75] Inventors: Samuel P. Sawan, Tyngsborough, Mass.; W. Dale Spall, Los Alamos, N. Mex.; Abdelhafid Talhi, Nashua, N.H.

[73] Assignee: University of Massachusetts Lowell, Lowell, Mass.

[21] Appl. No.: 670,585

[22] Filed: Jun. 26, 1996

[51] Int. Cl.$^6$ .................................................. C08F 6/28
[52] U.S. Cl. ................................... 528/487; 528/490
[58] Field of Search ........................... 528/487, 490

[56] References Cited

U.S. PATENT DOCUMENTS

| | | | |
|---|---|---|---|
| 3,985,650 | 10/1976 | Saitoh et al. | 210/44 |
| 4,253,948 | 3/1981 | Hardman et al. | 210/634 |
| 4,491,484 | 1/1985 | Williams | 134/4 |
| 4,654,062 | 3/1987 | Gottier | 62/17 |
| 4,877,530 | 10/1989 | Moses | 210/511 |
| 4,909,868 | 3/1990 | Melvin | 149/109.6 |
| 4,911,869 | 3/1990 | Meyer et al. | 264/50 |
| 4,923,720 | 5/1990 | Lee et al. | 427/422 |
| 4,962,275 | 10/1990 | Bruno | 585/834 |
| 4,964,995 | 10/1990 | Chum et al. | 210/634 |
| 5,013,366 | 5/1991 | Jackson et al. | 134/1 |
| 5,027,742 | 7/1991 | Lee et al. | 118/300 |
| 5,034,174 | 7/1991 | Kiczek et al. | 264/51 |
| 5,049,328 | 9/1991 | Meyer et al. | 264/50 |
| 5,087,370 | 2/1992 | Schultheis et al. | 210/638 |
| 5,126,058 | 6/1992 | Beckman | 210/774 |
| 5,138,075 | 8/1992 | Ohgaki et al. | 549/413 |
| 5,160,674 | 11/1992 | Colton et al. | 264/50 |
| 5,170,727 | 12/1992 | Nielsen | 110/346 |
| 5,178,735 | 1/1993 | Manabe et al. | 203/49 |
| 5,233,021 | 8/1993 | Sikorski | 528/491 |
| 5,279,615 | 1/1994 | Mitchell et al. | 8/142 |
| 5,290,603 | 3/1994 | Nielsen | 427/421 |
| 5,316,591 | 5/1994 | Chao et al. | 134/34 |
| 5,334,356 | 8/1994 | Baldwin et al. | 422/133 |
| 5,337,446 | 8/1994 | Smith et al. | 15/21.1 |
| 5,340,614 | 8/1994 | Perman et al. | 427/2.24 |
| 5,356,538 | 10/1994 | Wai et al. | 210/634 |
| 5,370,742 | 12/1994 | Mitchell et al. | 134/10 |
| 5,375,426 | 12/1994 | Burgener | 62/85 |
| 5,377,705 | 1/1995 | Smith, Jr. et al. | 134/95.3 |
| 5,418,256 | 5/1995 | Dhawan et al. | 521/44.5 |

FOREIGN PATENT DOCUMENTS

4204176-A1  8/1993  Germany.

*Primary Examiner*—Thomas R. Weber
*Attorney, Agent, or Firm*—Hamilton, Brook, Smith & Reynolds, P.C.

[57] ABSTRACT

A method for treating a plastic, such as polyethylene or polypropylene, to remove at least a portion of at least one contaminant includes combining the plastic with a supercritical medium, such as carbon dioxide or sulfur hexafluoride, whereby at least a portion of the contaminant dissolves in the supercritical medium. Alternatively, the plastic can be combined with a suitable liquid medium, such as carbon dioxide or liquid sulfur hexafluoride. At least a portion of the medium, containing the dissolved contaminant, is separated from the plastic, thereby removing at least a portion of the contaminant from the plastic.

49 Claims, 10 Drawing Sheets

5,756,657

METHOD OF CLEANING PLASTICS USING SUPER AND SUBCRITICAL MEDIA

GOVERNMENT FUNDING

This invention was sponsored by Grant No. 06-6604 provided by the Los Alamos National Laboratory, Department of Energy, and the Government has certain rights to the invention.

BACKGROUND OF THE INVENTION

Disposal of wastes by conventional methods, such as by use of landfills and incineration, is becoming more restrictive and prohibitively expensive. Further, disposal of particular types of wastes, such as plastics which are contaminated with oils, pose particularly difficult problems. For example, oils from contaminated plastic containers can contaminate the groundwater of landfills. Further, disposal of contaminated plastics by incineration can result in loss of partially decomposed pollutants as a consequence of incomplete combustion or of incomplete post-combustion scrubbing techniques. In addition, disposal of such materials rather than reuse necessitates the use of raw materials to replace lost materials.

Recycling is an increasingly attractive alternative to other conventional waste disposal methods. However, recycling of raw materials, such as plastics, typically requires various process steps to remove contaminants and thereby at least partially restore their utility. Further, some types of materials can be difficult to treat because methods and materials generally employed to remove or destroy contaminants often degrade or destroy the material being reclaimed. For example, use of organic solvents to remove oil contaminants from plastics can deleteriously affect the quality of the plastics. The commercial utility of plastics for reuse is thereby significantly limited. Further, cleaning solvents can themselves become contaminants of the plastics and also create the problem of how to dispose of contaminated solvents after use.

Therefore, a need exists for a method of treating plastics to remove contaminants that overcome, or minimizes the above-referenced problems.

SUMMARY OF THE INVENTION

The present invention relates to a method for treating a plastic to remove at least a portion of at least one contaminant from the plastic.

In one embodiment, the method includes combining polyethylene with a carbon dioxide medium, whereby at least a portion of at least one contaminant dissolves in the carbon dioxide medium. At least a portion of the carbon dioxide medium and dissolved contaminant are separated from the polyethylene, thereby removing at least a portion of the contaminant from the polyethylene.

Alternatively, the method includes combining polyethylene with a sulfur hexafluoride medium, whereby at least a portion of at least one contaminant dissolves in the sulfur hexafluoride medium. At least a portion of the sulfur hexafluoride medium and dissolved contaminant are separated from the polyethylene, thereby removing at least a portion of the contaminant from the polyethylene.

In another embodiment, the method includes combining polyethylene with a supercritical medium, whereby at least a portion of at least one contaminant dissolves in the supercritical medium. At least a portion of the supercritical medium and dissolved contaminant are separated from the polyethylene, thereby removing at least a portion of the contaminant from the polyethylene.

In still another embodiment, the method includes combining polypropylene with a supercritical medium, whereby at least a portion of at least one contaminant dissolves in the supercritical medium. At least a portion of the supercritical medium and dissolved contaminant are separated from the polypropylene, thereby removing at least a portion of the contaminant from the polypropylene.

Another embodiment includes combining polypropylene with a carbon dioxide medium, whereby at least a portion of at least one contaminant dissolves in the carbon dioxide medium, and separating at least a portion of the carbon dioxide medium and dissolved contaminant from the polypropylene, thereby removing at least a portion of the contaminant from the polypropylene.

Still another embodiment includes combining plastic with a sulfur hexafluoride medium, whereby at least a portion of at least one contaminant dissolves in the sulfur hexafluoride medium. At least a portion of the sulfur hexafluoride medium and dissolved contaminant are separated from the plastic, thereby removing at least a portion of the contaminant from the plastic.

Alternatively, the method includes combining a plastic bottle with a supercritical medium, whereby at least a portion of at least one contaminant dissolves in the supercritical medium. At least a portion of the supercritical medium and dissolved contaminant are separated from the plastic bottle, thereby removing at least a portion of the contaminant from the plastic bottle.

This invention has many advantages. For example, the cleaning media employed generally do not cause decomposition of the plastic. However, in some cases bubbles may form which can be overcome by adjustment of the process conditions. In the case where subsequent reprocessing produces bubbles, the formation of bubbles during the cleaning process may not be a problem. Also, contaminants are removed and may readily be collected without generating significant amounts of partially decomposed byproducts, such as can be produced by incomplete combustion of plastic wastes. Further, following removal of contaminants, the cleaning media can be regenerated by volatilization, thereby separating the contaminants from the cleaning media. The cleaning media can also be used or reused to manipulate the resultant form of the decontaminated plastic. For example, the media can be employed to foam the plastic or shape the plastic for a particular use, such as for production of foamed building materials.

DETAILED DESCRIPTION OF THE INVENTION

Figure 1:
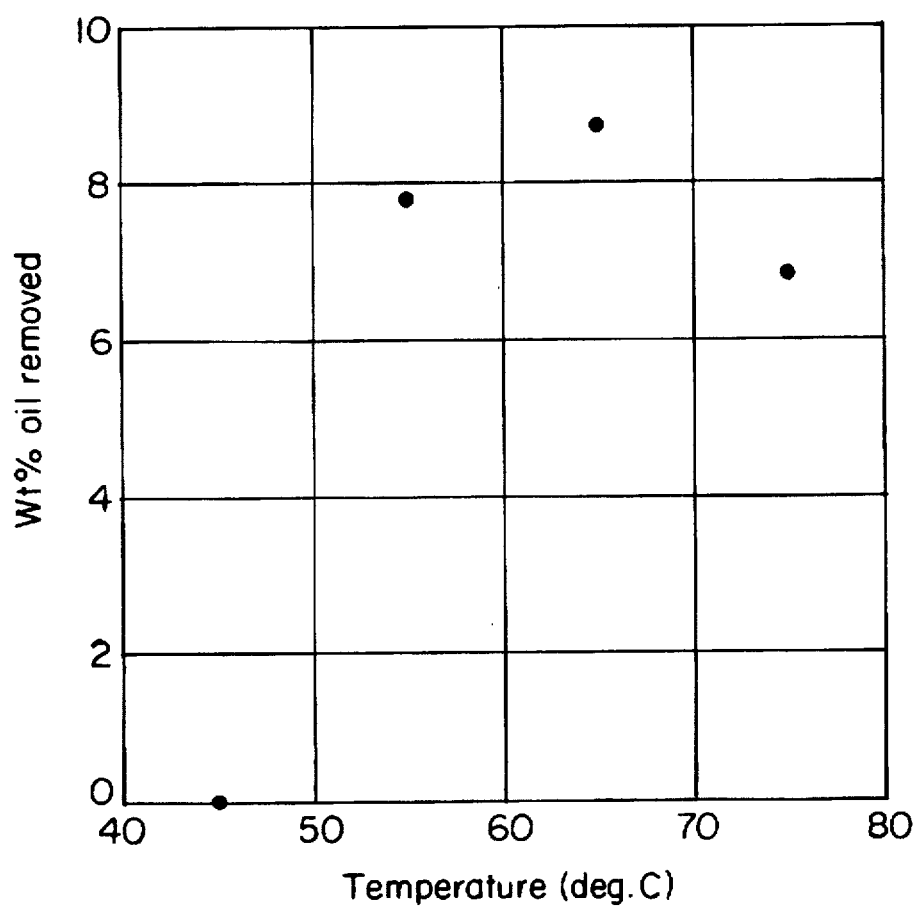
FIG. 1 includes measurements of the amount of vegetable oil contaminant removed from high-density polyethylene, by the method of the invention, versus temperature at a pressure of 1,500 psig using 40 ml of supercritical carbon dioxide at a contamination level of 0.5 weight percent.

The features and other details of the apparatus of the invention will now be more particularly described, with reference to the accompanying drawings, and pointed out in the claims. It will be understood that the particular embodiments of the invention are shown by way of illustration and not as limitations of the invention. The principle features of this invention can be employed in various embodiments without departing from the scope of the invention.

The method of the invention generally relates to treating a suitable plastic, such as polyethylene or polypropylene, to remove at least a portion of at least one contaminant, such as an oil. As used herein, the term "contaminant" means at least one contaminant and encompasses "contaminant" and "contaminants." Examples of oils that can be removed by the method of the invention include vegetable oil and motor oil. The method includes combining the plastic with a carbon dioxide or sulfur hexafluoride medium. The medium can be at a temperature and a pressure that are supercritical for the medium. At least a portion of the contaminant dissolves in the medium. At least a portion of the medium containing the dissolved contaminant is then separated from the plastic, thereby removing at least a portion of the contaminant from the plastic.

In each case, the plastic can be combined with a suitable cleaning medium, such as carbon dioxide or sulfur hexafluoride, by exposing the carbon dioxide or sulfur hexafluoride to a temperature and pressure which are supercritical for the carbon dioxide or sulfur hexafluoride, to thereby form the supercritical medium. Optionally, the supercritical medium may include a suitable cosolvent. The supercritical medium is then directed into a suitable apparatus, containing the contaminated polyethylene or polypropylene, such as supercritical fluid apparatus manufactured by ISCO, Inc. The plastic is exposed to the supercritical medium for a period of time that is sufficient to cause at least a portion of the contaminant to dissolve in the supercritical medium. In one embodiment, the plastic is exposed to 3.5 cartridge volumes of the supercritical medium. The medium is then discharged from the apparatus for subsequent discharge to the atmosphere or other suitable treatment which can permit reuse. In one embodiment, where the medium is under supercritical temperature and pressure for the medium, the medium is returned to standard temperature and pressure, whereby the medium, such as carbon dioxide or sulfur hexafluoride, volatilizes. Upon volatilization, the contaminants will generally precipitate, consequently causing separation of the cleaning medium from the contaminants. The cleaning medium can then be reused.

In one embodiment, the plastic is polyethylene and the medium is a carbon dioxide medium. The carbon dioxide that is combined with the polyethylene can be in the form of a liquid. Alternatively, the carbon dioxide medium that is combined with the polyethylene is at a temperature and a pressure that are supercritical for carbon dioxide. In a preferred embodiment, the carbon dioxide medium that is combined with the polyethylene is at a temperature of at least about 55° C. Also, in a preferred embodiment, the carbon dioxide medium that is combined with the polyethylene is at a pressure of at least about 3,000 psig.

In one embodiment, the polyethylene is nonfiberous, such as polyethylene that is in the form of a bottle.

Optionally, the polyethylene can be combined with a sulfur hexafluoride medium. For example, the carbon dioxide medium can be combined with a sulfur hexafluoride medium, whereby the polyethylene is treated by both the carbon dioxide medium and the sulfur hexafluoride medium. The sulfur hexafluoride that is combined with the polyethylene can be at a temperature and a pressure that are supercritical for sulfur hexafluoride. Preferably, the sulfur hexafluoride that is combined with the polyethylene is at a temperature of at least about 70° C. Also, preferably the sulfur hexafluoride that is combined with the polyethylene is at a pressure of at least about 4,000 psig.

As another option, the polyethylene that is treated by the method of the invention, can be foamed. For example, the polyethylene can be foamed by combining the polyethylene, from which at least a portion of the dissolved contaminant has been removed, with additional carbon dioxide. In one embodiment, the additional carbon dioxide is at a temperature and a pressure that are supercritical for carbon dioxide.

In another embodiment, polyethylene is treated to remove at least a portion of at least one contaminant by combining the polyethylene with a sulfur hexafluoride medium, whereby at least a portion of the contaminant dissolves in the sulfur hexafluoride medium. At least a portion of the sulfur hexafluoride medium and dissolved contaminant are then separated from the polyethylene, thereby removing at least a portion of the contaminant from the polyethylene.

In this embodiment, the sulfur hexafluoride medium that is combined with the polyethylene can be in the form of a liquid. Alternatively, the sulfur hexafluoride medium that is combined with the polyethylene can be at a temperature and a pressure that are supercritical for sulfur hexafluoride. Preferably, the sulfur hexafluoride medium that is combined with the polyethylene is at a temperature of at least about 70° C. and is at a pressure of at least about 4,000 psig.

In another embodiment, polypropylene is treated to remove at least a portion of at least one contaminant.

Polypropylene is combined with a supercritical medium, whereby at least a portion of the contaminant dissolves in the supercritical medium. In one embodiment, the supercritical medium includes carbon dioxide. In another embodiment, the supercritical medium includes sulfur hexafluoride. At least a portion of the supercritical medium and dissolved contaminant are separated from the polypropylene, thereby removing at least a portion of the contaminant from the polypropylene.

Alternatively, the polypropylene can be treated by combining the polypropylene with a carbon dioxide medium that is in the form of a liquid. Alternatively, the carbon dioxide medium that is combined with the polypropylene can be at a temperature and a pressure that are supercritical for carbon dioxide. Preferably, the carbon dioxide medium that is combined with the polypropylene is at a temperature of at least about 55° C. and a pressure of at least about 3,000 psig.

In another alternative, the method includes treating a plastic, such as a bulk plastic, to remove at least a portion of at least one contaminant of the plastic. The method includes combining the plastic with a sulfur hexafluoride medium, whereby at least a portion of the contaminant dissolves in the sulfur hexafluoride medium.

At least a portion of the sulfur hexafluoride medium and dissolved contaminant are separated from the plastic, thereby removing at least a portion of the contaminant from the plastic.

The sulfur hexafluoride that is combined with the plastic can be in the form of a liquid. Alternatively, the sulfur hexafluoride that is combined with the plastic is at a temperature and a pressure that are supercritical for sulfur hexafluoride. Preferably, the sulfur hexafluoride that is combined with the plastic is at a temperature of at least about 70° C. Also, preferably, the sulfur hexafluoride that is combined with the plastic is at a pressure of at least about 4,000 psig. In one embodiment, the bulk plastic is in the form of a bottle.

In still another embodiment of the method, a plastic bottle is treated to remove at least a portion of at least one contaminant from the bottle. The method includes combining a plastic bottle with a supercritical medium, whereby at least a portion of the contaminant dissolves in the supercritical medium. At least a portion of the supercritical medium and dissolved contaminant are separated from the plastic bottle, thereby removing at least a portion of the contaminant from the plastic bottle. In one embodiment, the supercritical medium that is combined with the plastic bottle includes carbon dioxide. In another embodiment, the supercritical medium that is combined with the plastic bottle includes sulfur hexafluoride.

In a further embodiment, the polypropylene can be treated by combining the plastic with a medium. The medium medium includes at least a portion of carbon dioxide and at least a portion of sulfur hexaflouride. The medium can be in the form of a liquid or at a temperature and a pressure that are supercritical for the medium.

The invention will now be further described by the following examples. All parts and percentages are by weight unless otherwise specified.

EXEMPLIFICATION

The following is a summary of the results obtained from cleaning oil-contaminated high-density polyethylene with supercritical carbon dioxide ($CO_2$) and sulfur hexafluoride ($SF_6$).

I. Determination of the Optimum Conditions for Cleaning

Determination of the optimum temperature: The optimum temperature was determined by choosing an arbitrary pressure of 1,500 psig and arbitrary volume of supercritical $CO_2$ or $SF_6$ of 40 ml. Then the procedure below was followed in determining the behavior of the percent oil removed vs. temperature (see FIG. 1).

Determination of the optimum pressure: The optimum pressure was determined using the optimum previously determined temperature and a volume of supercritical $CO_2$ or $SF_6$ of 40 ml. Then the procedure below was followed in determining the behavior of the percent oil removed vs. pressure (see FIG. 2).

Determination of the volume of supercritical fluid to achieve 100% oil removal: The previously determined optimum temperature and pressure were used to determined the volume of supercritical fluid necessary to clean the contaminated plastics completely.

II. Materials

1. High-density polyethylene (hereinafter "HDPE") (Solvay Polymers, Inc.; Grade HP58-25-153; Lot #C40512G 12A);
2. Pure vegetable oil (DeMoulas Market Basket, Inc.);
3. Mobil 1 Formula 15W-50 motor oil;
4. $CO_2$ and $SF_6$ (Northeast Airgas, Inc.)

III. Procedure

Using an (ISCO, Inc.) SFX™ 220 supercritical fluid extraction apparatus, the following procedure was employed:

1. HDPE pellets were contaminated with oil to a level of 0.5 wt %;
2. A container to hold the pellets (standard ISCO, Inc. cartridge) was loaded with 6 grams of the contaminated pellets;
3. The experimental conditions were set on the ISCO SFX™ 200 controller, then the contaminant cleaning was started;
4. The weight of the oil collected in the separation vial was measured; and
5. The amount of oil removed from the pellets was calculated.

IV. Results

A. Effect of Supercritical Carbon Dioxide
 1. Vegetable Oil:

FIG. 1 shows the results of the dependence of the percentage of vegetable oil removed on temperature. At a pressure of 1,500 psig, the percentage of oil removed did not depend significantly on the temperature. The different values obtained at the temperature of 55° C. and higher could easily be accounted for by the experimental error. Therefore, the lowest temperature of 55° C. was chosen as the optimum.

Figure 2:
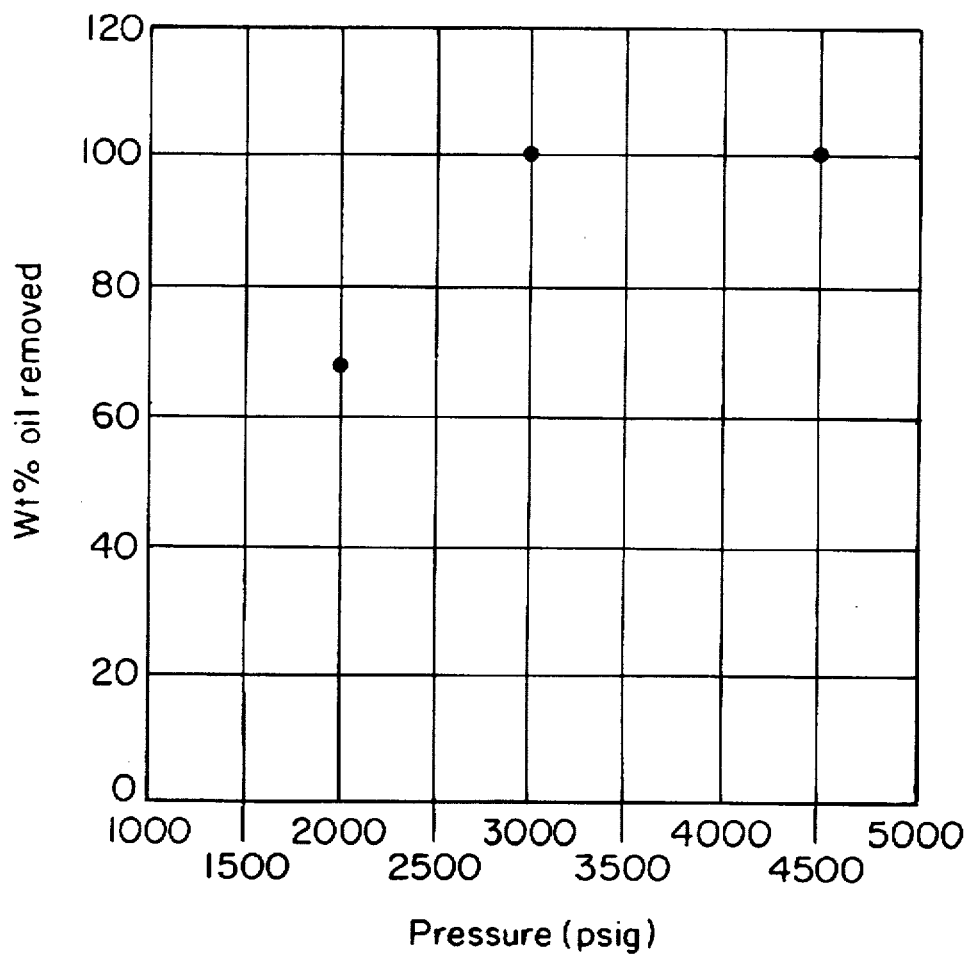
FIG. 2 includes measurements of the amount of vegetable oil contaminant removed from high-density polyethylene, by the method of the invention, versus pressure at a temperature of 55° C using 40 ml of supercritical carbon dioxide at a contamination level of 0.5 weight percent.

FIG. 2 shows the dependence of the percentage of vegetable oil removed on the pressure. From the curve showing the dependence of solubility on pressure, it could be observed that the percentage of oil removed increased with increasing pressure. At pressures equal to or greater than 3,000 psig, no significant change in solubility could be noted. Therefore, 3,000 psig was chosen as the optimum pressure at 55° C.

Figure 3:
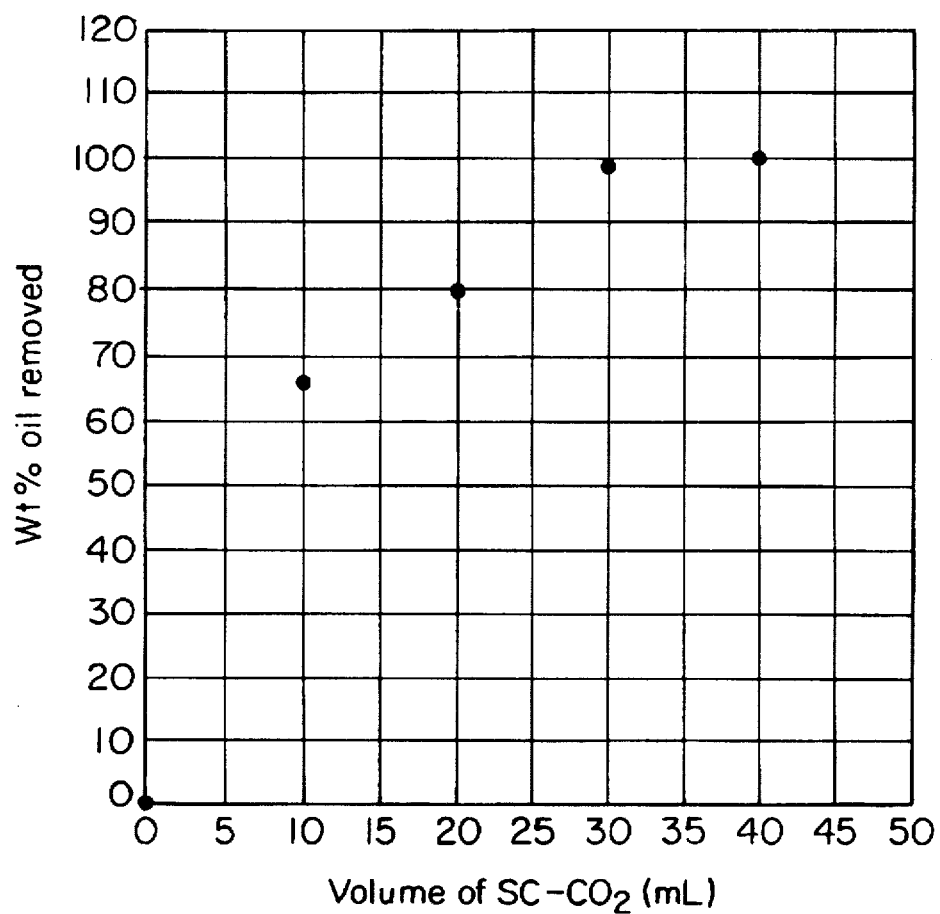
FIG. 3 includes measurements of the amount of vegetable oil contaminant removed from high density polyethylene, by the method of the invention, versus volume of supercritical carbon dioxide at a temperature of 55° C. and a pressure of 3,000 psig, at a contamination level of 0.5 weight percent.

The results of the series of experiments carried out to determine the volume of the supercritical $CO_2$ necessary to clean the plastics completely (i.e., 100% removal of oil) are shown in FIG. 3. It was determined from the plot of FIG. 3 that the volume necessary to clean the contaminated plastics completely under the experimental conditions of T=55° C., P=3,000 psig at a level of contamination of 0.5 wt % was 35 ml.

Figure 4:
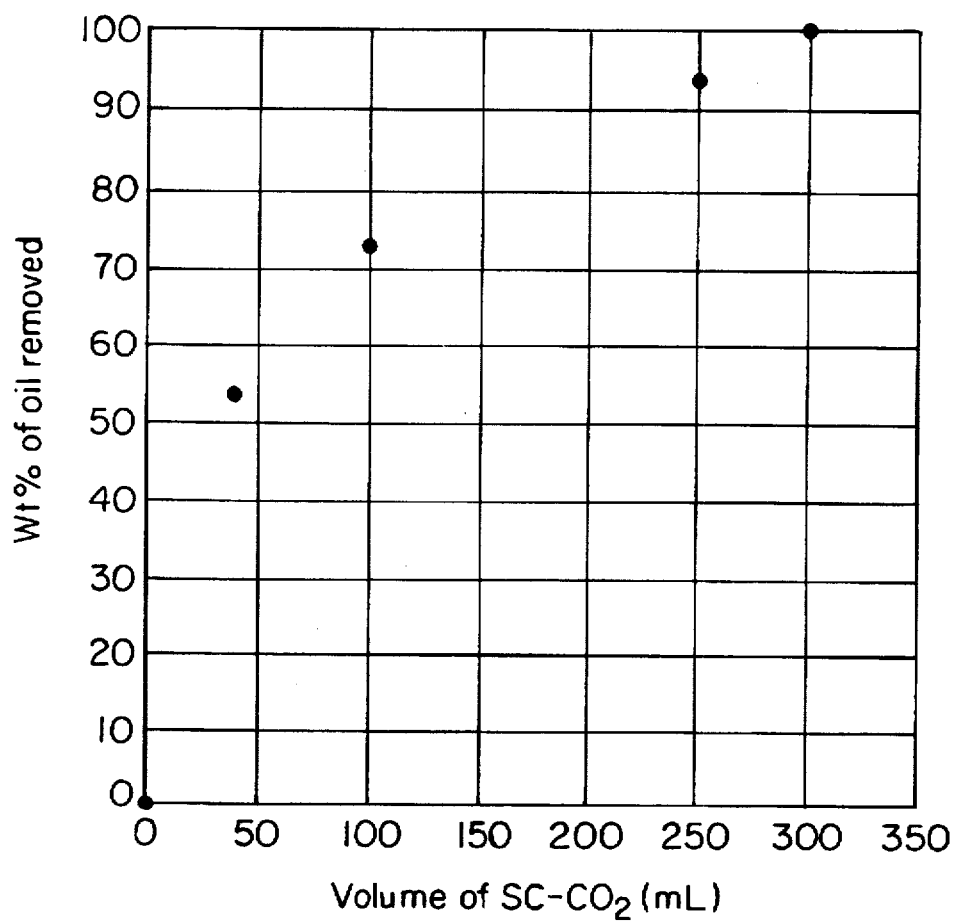
FIG. 4 includes measurements of the amount of motor oil contaminant removed from high-density polyethylene, by the method of the invention, versus volume of supercritical carbon dioxide at a temperature of 65° C., a pressure of 4,000 psig at a contamination level of 0.5 weight percent.

2. Motor Oil:

The same procedure used in the optimization of the temperature and pressure in the cleaning of vegetable oil was repeated here. FIG. 4 shows the results of the dependence of the percentage of motor oil cleaned versus the volume of supercritical carbon dioxide. These results show the ability of supercritical carbon dioxide to clean motor oil completely (i.e., 100 percent) off HDPE.

B. Effect of Supercritical Sulfur Hexafluoride

Figure 5:
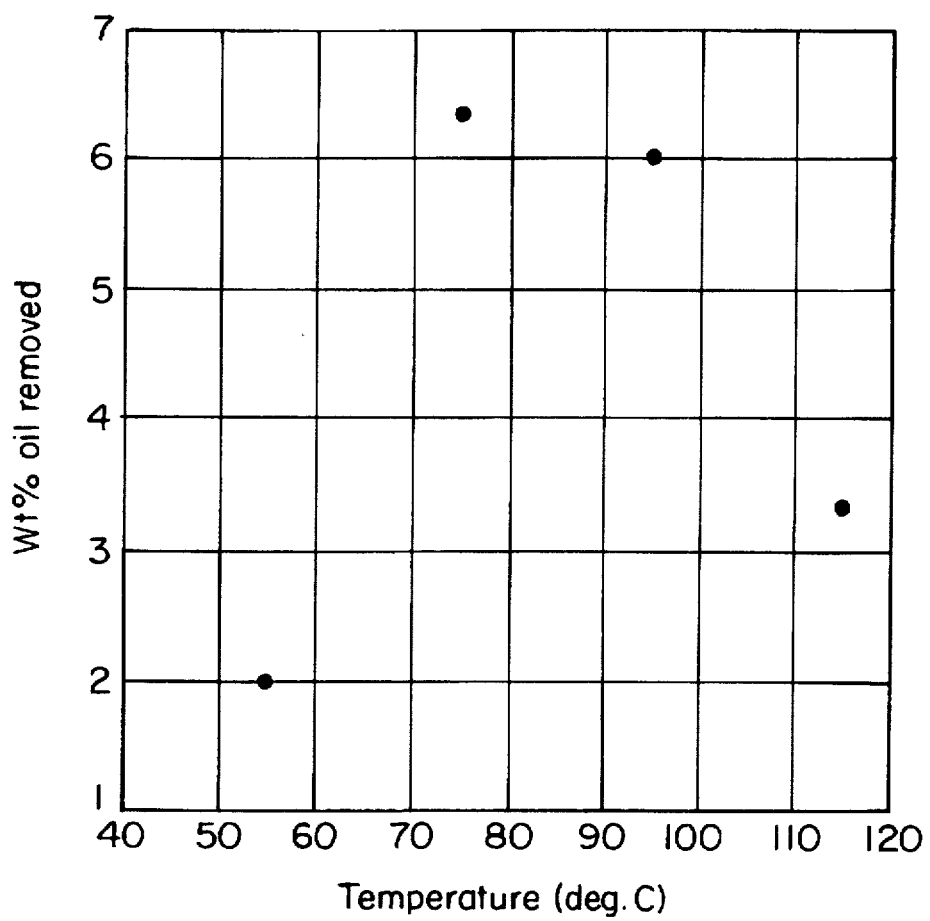
FIG. 5 includes measurements of the amount of vegetable oil contaminant removed from high-density polyethylene, by the method of the invention, versus temperature at a pressure of 1,500 psig using 40 ml of supercritical sulfur hexafluoride at a contamination level of 0.5 weight percent.
Figure 6:
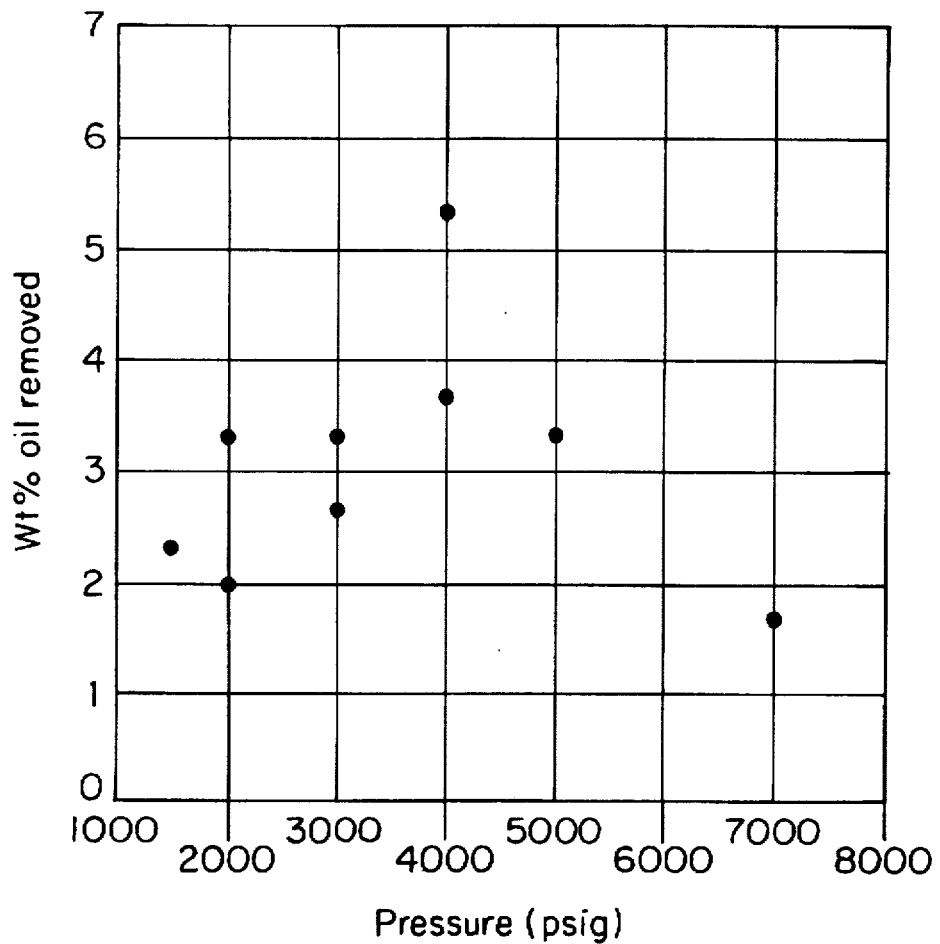
FIG. 6 includes measurements of the amount of vegetable oil contaminant removed from high-density polyethylene, by the method of the invention, versus pressure at a temperature of 75° C. using 40 ml of supercritical sulfur hexafluoride at a contamination level of 0.5 weight percent.

1. Vegetable Oil:

FIG. 5 shows the effect of temperature on the percentage of vegetable oil removed at a pressure of 1,500 psig and a volume of 40 ml supercritical sulfur hexafluoride. The optimum temperature was estimated to be about 75° C. The results of FIG. 6 suggest a trend of increasing percent of vegetable oil removed with an increase of supercritical sulfur hexafluoride pressure.

The increase in the percent oil removed reached an apparent optimum value at a pressure of about 4,000 psig.

Figure 7:
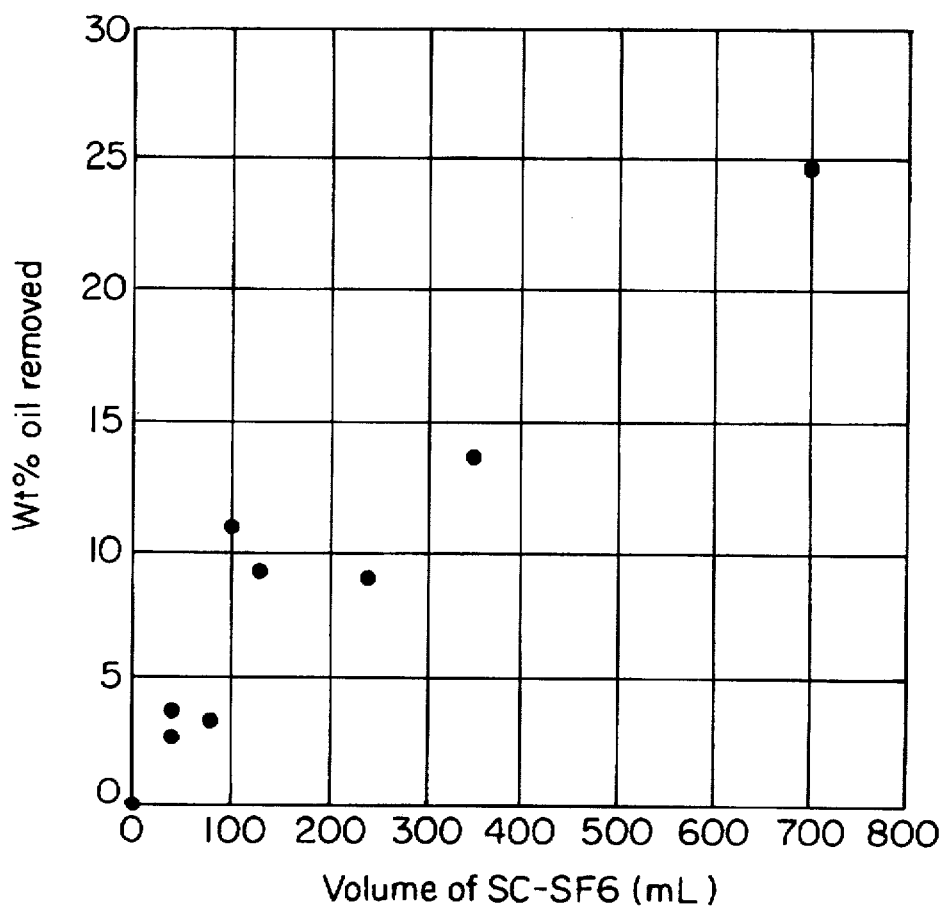
FIG. 7 includes measurements of the amount of vegetable oil contaminant removed from high-density polyethylene, by the method of the invention, versus volume of supercritical sulfur hexafluoride at a temperature of 75° C., a pressure of 4,000 psig at a contamination level of 0.5 weight percent.

Therefore, the 4,000 psig pressure was estimated to be the optimum pressure and was used in generating data of the percent oil removed versus the volume of supercritical sulfur hexafluoride. The result of the experiments on the relationship between the percent oil removed and the volume of supercritical sulfur hexafluoride are plotted in FIG. 7. The data of FIG. 7 showed a linear increase in the percent oil removed with the increase in the supercritical sulfur hexafluoride volume. However, only 24.7 wt % of the original amount of the contaminant was removed after washing with 700 ml of supercritical sulfur hexafluoride at the selected experimental conditions.

Figure 8:
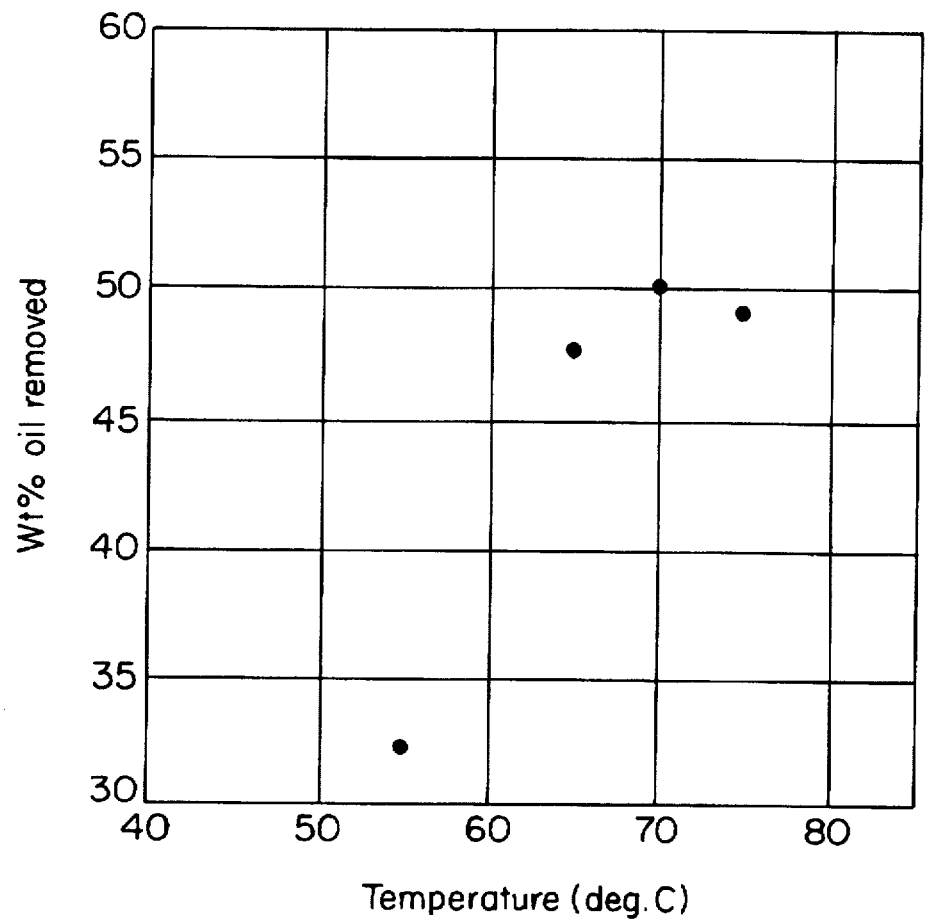
FIG. 8 includes measurements of the amount of motor oil contaminant removed from high-density polyethylene, by the method of the invention, versus temperature using supercritical sulfur hexafluoride at a pressure of 4,000 psig at a contamination level of 0.5 weight percent.
Figure 9:
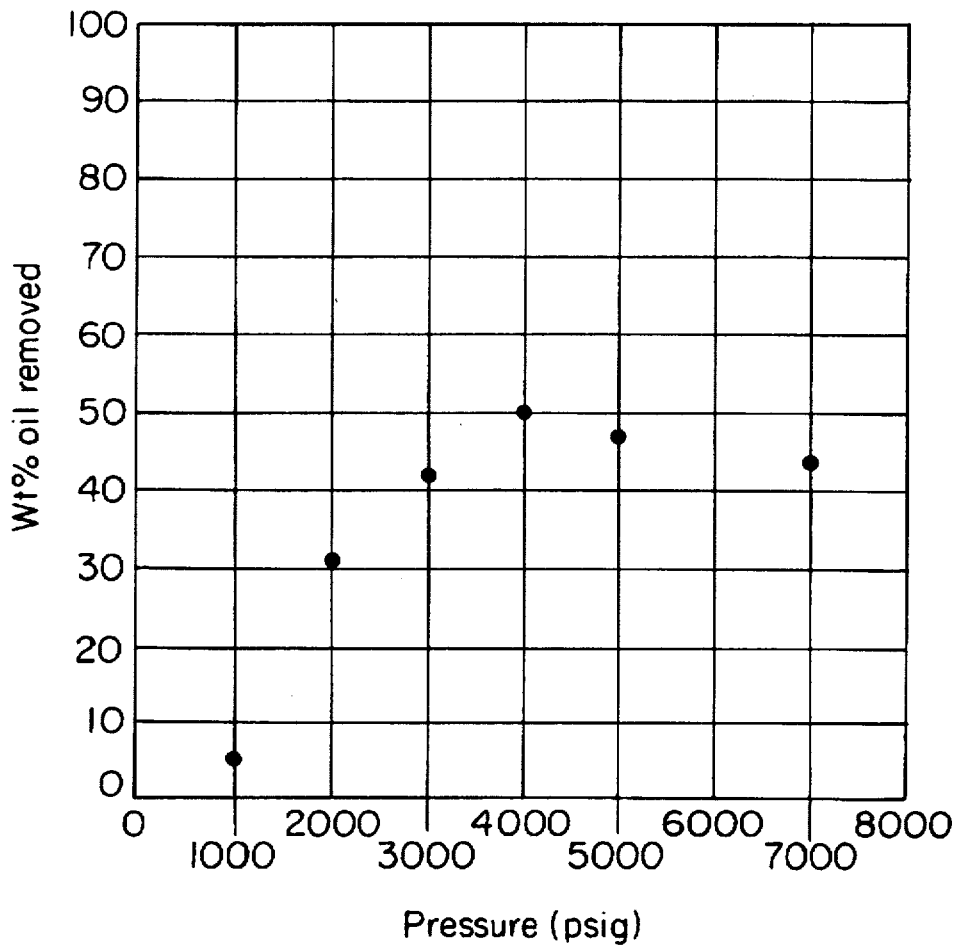
FIG. 9 includes measurements of the amount of motor oil contaminant removed from high-density polyethylene, by the method of the invention, versus pressure at a temperature of 70° C. at a contamination level of 0.5 weight 30 percent, using 50 ml of supercritical sulfur hexafluoride.
Figure 10:
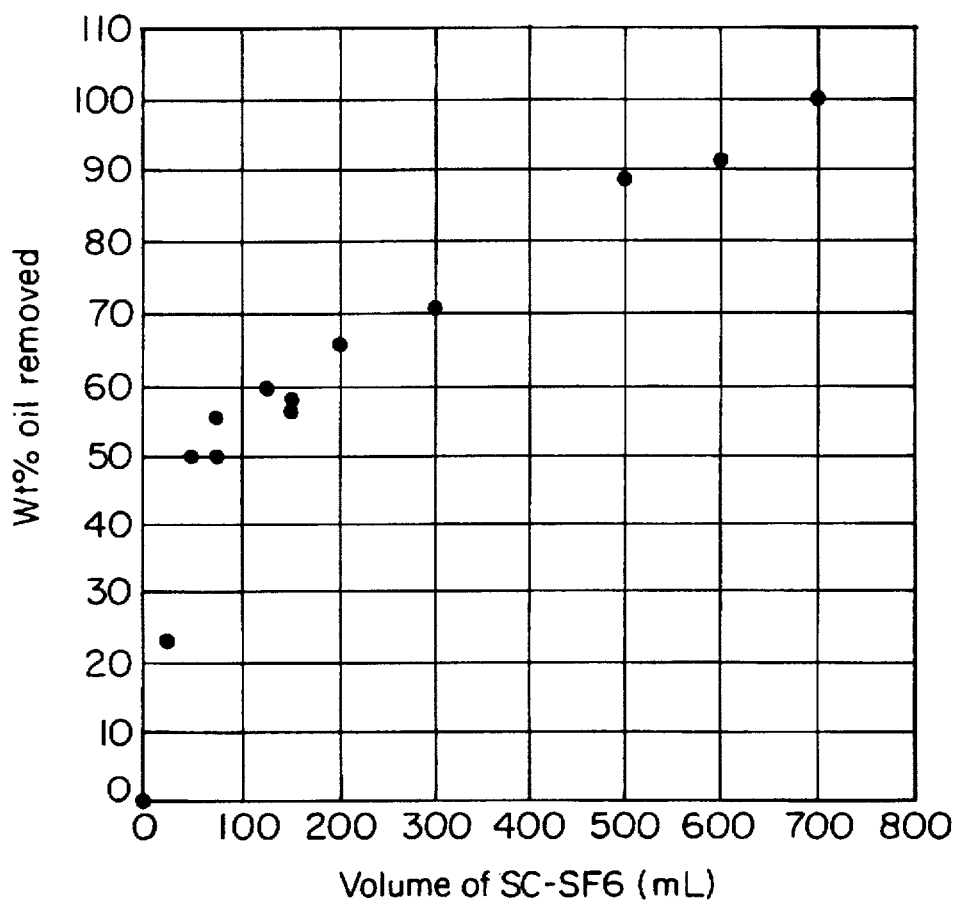
FIG. 10 includes measurements of the amount of motor oil contaminant removed from high-density polyethylene, by the method of the invention, versus volume of supercritical sulfur hexafluoride at a temperature of 70° C., a pressure of 4,000 psig at a contamination level of 0.5 weight percent.

2. Motor oil:

The same procedure used in the cleaning of vegetable oil was repeated in determining the optimum temperature and pressure for cleaning motor oil-contaminated HDPE. The results of this process are presented in FIGS. 8–10. In this case, these results suggested a temperature of 70° C. and a pressure of 4,000 psig as the optimum operating conditions. FIG. 10 shows the results of the potential of supercritical sulfur hexafluoride as the cleaning agent for motor oil. These results show 100 percent cleaning of motor oil via supercritical sulfur hexafluoride.

V. Summary and Conclusions

According to these results, supercritical carbon dioxide is an efficient solvent for use in cleaning vegetable oil-contaminated HDPE.

The results of the experiments on the cleaning of motor oil via the use of supercritical sulfur hexafluoride at a temperature of 700° C. and a pressure of 4,000 psig and of supercritical carbon dioxide at a temperature of 65° C. and a pressure of 4,000 psig show 100 percent cleaning of the motor oil-contaminated HDPE.

EQUIVALENTS

Those skilled in the art will recognize, or be able to ascertain using no more than routine experimentation, many equivalents to specific embodiments of the invention described specifically herein. Such equivalents are intended to be encompassed in the scope of the following claims.

We claim:

1. A method for treating polyethylene to remove at least a portion of at least one contaminant, comprising the steps of:

a) combining the polyethylene with a carbon dioxide medium, whereby at least a portion of said contaminant dissolves in the carbon dioxide medium; and b) separating at least a portion of the carbon dioxide medium and dissolved contaminant from the polyethylene, thereby removing at least a portion of the contaminant from the polyethylene.

2. The method of claim 1, wherein the carbon dioxide medium that is combined with the polyethylene is in the form of a liquid.

3. The method of claim 1, wherein the carbon dioxide medium that is combined with the polyethylene is at a temperature and a pressure that are supercritical for carbon dioxide.

4. The method of claim 3, wherein the carbon dioxide medium that is combined with the polyethylene is at a temperature of at least about 55° C.

5. The method of claim 4, wherein the carbon dioxide medium that is combined with the polyethylene is at a pressure of at least about 3,000 psig.

6. The method of claim 1, wherein the polyethylene is nonfibrous form.

7. The method of claim 6, wherein the polyethylene is in the form of a shredded bottle.

8. The method of claim 1, further including the step of combining the polyethylene with a sulfur hexafluoride medium.

9. The method of claim 8, further including the step of combining the carbon dioxide medium and the sulfur hexafluoride medium.

10. The method of claim 8, wherein the sulfur hexafluoride that is combined with the polyethylene is at a temperature and a pressure that are supercritical for sulfur hexafluoride.

11. The method of claim 10, wherein the sulfur hexafluoride that is combined with the polyethylene is at a temperature of at least about 70° C.

12. The method of claim 11, wherein the sulfur hexafluoride that is combined with the polyethylene is at a pressure of at least about 4,000 psig.

13. The method of claim 1, further including the step of foaming the polyethylene.

14. The method of claim 13, wherein the polyethylene is foamed by combining the polyethylene, from which at least a portion of the dissolved contaminant has been removed, with additional carbon dioxide.

15. The method of claim 14, wherein said additional carbon dioxide is at a temperature and pressure that are supercritical for carbon dioxide.

16. A method for treating polyethylene to remove at least a portion of at least one contaminant, comprising the steps of:

a) combining the polyethylene with a sulfur hexafluoride medium, whereby at least a portion of said contaminant dissolves in the sulfur hexafluoride medium; and b) separating at least a portion of the sulfur hexafluoride medium and dissolved contaminant from the polyethylene, thereby removing at least a portion of the contaminant from the polyethylene.

17. The method of claim 16, wherein the sulfur hexafluoride medium that is combined with the polyethylene is in the form of a liquid.

18. The method of claim 16, wherein the sulfur hexafluoride medium that is combined with the polyethylene is at a temperature and a pressure that are supercritical for sulfur hexafluoride.

19. The method of claim 18, wherein the sulfur hexafluoride medium that is combined with the polyethylene is at a temperature of at least about 70° C.

20. The method of claim 19, wherein the sulfur hexafluoride medium that is combined with the polyethylene is at a pressure of at least about 4,000 psig.

21. A method for treating polyethylene to remove at least a portion of at least one contaminant, comprising the steps of:
   a) combining the polyethylene with a supercritical medium, whereby at least a portion of said contaminant dissolves in the supercritical medium; and
   b) separating at least a portion of the supercritical medium and dissolved contaminant from the polyethylene, thereby removing at least a portion of the contaminant from the polyethylene.

22. The method of claim 21, wherein said supercritical medium includes carbon dioxide.

23. The method of claim 22, wherein the supercritical medium includes a suitable cosolvent.

24. The method of claim 21, wherein said supercritical medium includes sulfur hexafluoride.

25. The method of claim 24, wherein the supercritical medium includes a suitable cosolvent.

26. A method for treating polypropylene to remove at least a portion of at least one contaminant, comprising the steps of:
   a) combining the polypropylene with a supercritical medium, whereby at least a portion of said contaminant dissolves in the supercritical medium; and
   b) separating at least a portion of the supercritical medium and dissolved contaminant from the polypropylene, thereby removing at least a portion of the contaminant from the polypropylene.

27. The method of claim 26, wherein said supercritical medium includes carbon dioxide.

28. The method of claim 26, wherein said supercritical medium includes sulfur hexafluoride.

29. A method for treating polypropylene to remove at least a portion of at least one contaminant, comprising the steps of:
   a) combining the polypropylene with a carbon dioxide medium, whereby at least a portion of said contaminant dissolves in the carbon dioxide medium; and
   b) separating at least a portion of the carbon dioxide medium and dissolved contaminant from the polypropylene, thereby removing at least a portion of the contaminant from the polypropylene.

30. The method of claim 29, wherein the carbon dioxide medium that is combined with the polypropylene is in the form of a liquid.

31. The method of claim 29, wherein the carbon dioxide medium that is combined with the polypropylene is at a temperature and a pressure that are supercritical for carbon dioxide.

32. The method of claim 30, wherein the carbon dioxide medium that is combined with the polypropylene is at a temperature of at least about 55° C.

33. The method of claim 31, wherein the carbon dioxide medium that is combined with the polypropylene is at a pressure of at least about 3,000 psig.

34. A method for treating a plastic to remove at least a portion of at least one contaminant, comprising the steps of:
   a) combining the plastic with a sulfur hexafluoride medium, whereby at least a portion of said contaminant dissolves in the sulfur hexafluoride medium; and
   b) separating at least a portion of the sulfur hexafluoride medium and dissolved contaminant from the plastic, thereby removing at least a portion of the contaminant from the plastic.

35. The method of claim 34, wherein said plastic includes polyethylene.

36. The method of claim 34, wherein said plastic includes polypropylene.

37. The method of claim 34, wherein the sulfur hexafluoride that is combined with the plastic is in the form of a liquid.

38. The method of claim 34, wherein the sulfur hexafluoride that is combined with the plastic is at a temperature and a pressure that are supercritical for sulfur hexafluoride.

39. The method of claim 38, wherein the sulfur hexafluoride that is combined with the plastic is at a temperature of at least about 70° C.

40. The method of claim 39, wherein the sulfur hexafluoride that is combined with the plastic is at a pressure of at least about 4,000 psig.

41. The method of claim 34, further including the step of foaming the plastic.

42. The method of claim 41, wherein the polyethylene is foamed by combining the polyethylene, from which at least a portion of the dissolved contaminant has been removed, with additional sulfur hexafluoride.

43. The method of claim 42, wherein said additional sulfur hexafluoride is at a temperature and pressure that are supercritical for sulfur hexafluoride.

44. The method of claim 43, wherein said plastic is a fluoropolymer.

45. The method of claim 34, wherein the plastic is in the form of a shredded bottle.

46. A method for treating a plastic bottle to remove at least a portion of at least one contaminant, comprising the steps of:
   a) combining the plastic bottle with a supercritical medium, whereby at least a portion of said contaminant dissolves in the supercritical medium; and
   b) separating at least a portion of the supercritical medium and dissolved contaminant from the plastic bottle, thereby removing at least a portion of the contaminant from the plastic bottle.

47. The method of claim 46, wherein the supercritical medium that is combined with the plastic bottle includes carbon dioxide.

48. The method of claim 46, wherein the supercritical medium that is combined with the plastic bottle includes sulfur hexafluoride.

49. A method for treating a plastic to remove at least a portion of at least one contaminant, comprising the steps of:
   a) combining the plastic with a medium, whereby at least a portion of said contaminant dissolves in the medium; and
   b) separating at least a portion of the supercritical medium and dissolved contaminant from the plastic, thereby removing at least a portion of the contaminant from the plastic and restoring substantially all of the original properties to the plastic.

* * * * *